United States Patent [19]

Masham

[11] 4,161,359
[45] Jul. 17, 1979

[54] APPARATUS FOR SYNCHRONIZING MOVEMENT BETWEEN AN OPTICAL SCANNING SYSTEM AND AN IMAGING MEMBER

[75] Inventor: Roger D. Masham, Newport Pagnell, England

[73] Assignee: Xerox Corporation, Stamford, Conn.

[21] Appl. No.: 844,991

[22] Filed: Oct. 25, 1977

[30] Foreign Application Priority Data

Dec. 17, 1976 [GB] United Kingdom ............... 52776/76

[51] Int. Cl.² ............................................ G03G 21/00
[52] U.S. Cl. ...................................................... 355/8
[58] Field of Search ....................... 355/8, 3 R, 11, 14, 355/66; 74/37; 200/61.14

[56] References Cited

U.S. PATENT DOCUMENTS

| | | | |
|---|---|---|---|
| 3,612,679 | 10/1971 | Punnett et al. | 355/8 |
| 3,730,622 | 5/1973 | Freeman et al. | 355/14 |
| 3,736,056 | 5/1973 | Burnet et al. | 355/8 |
| 3,815,991 | 6/1974 | Janssen et al. | 355/8 X |
| 3,877,807 | 4/1975 | Kurita | 355/8 X |
| 3,910,699 | 10/1975 | Middleton | 355/8 X |
| 3,918,806 | 11/1975 | Cook | 355/8 |

Primary Examiner—R. L. Moses

[57] ABSTRACT

A scanning optical system for a photocopier is mounted on a reciprocating carriage which travels between a start-of-scan and end-of-scan position. The carriage is engaged and driven by a drive transmission member which, in a preferred embodiment, is an endless belt having detents spaced along its length. The belt simultaneously drives the support for a photosensitive surface.

6 Claims, 2 Drawing Figures

APPARATUS FOR SYNCHRONIZING MOVEMENT BETWEEN AN OPTICAL SCANNING SYSTEM AND AN IMAGING MEMBER

BACKGROUND OF THE INVENTION

This invention relates to photocopying machines which incorporate a scanning optical system, and more particularly to drive systems for use in such machines.

Photocopying machines such as those described in U.S. Pat. No. 3,062,109 incorporate a scanning optical system for exposing successive portions of a document to be copied to a moving photosensitive surface. As described in that specification the document may be held stationary during scanning while one or more optical elements (mirror, lenses, lamp, etc.) are driven. Or the optical system may be held stationary during scanning while the document is driven therepast. In the past, scanning systems have been utilized in which the moving element or elements of the scanning system, for example lamps and mirrors, or a document platen, have been mounted on a carriage and this carriage driven in one direction by means of a cable connected to the main drive of the machine through a clutch, and returned to its start-of-scan under the influence of a spring when the clutch is disengaged. In such systems it is most important that the movements of the scanning system and the photosensitive surface be carefully synchronized since loss of synchronization will result in image distortion. Loss of synchronism will result from compliance in the link between the photosensitive surface and the scanning system. This compliance is due at least in part to the mechanical interfaces in the drive and it is an object of this invention to provide a system in which synchronism errors or alleviated.

SUMMARY OF THE INVENTION

To this end, the invention consists of a photocopier including a support for a photosensitive surface and a scanning optical system including a reciprocable scanning carriage, common drive means for driving the carriage and support in synchronism during scanning movement of the carriage, said drive means comprising a drive transmission member which, in operation, continuously drivingly engages the support and discontinuously drivingly engages the carriage.

In a preferred form the carriage is engageable by the drive transmission member in its start-of-scan position and means are provided for disengaging the carriage from the drive transmission member at the end-of-scan position of the carriage, means also being provided to return the carriage to the start-of-scan position.

The interval between the scanning strokes of the carriage may be controlled by means of inhibiting engagement of the drive member with the carriage or the drive transmission member any have detents arranged at intervals therealong for engaging the carriage.

Where the photocopier includes a photoreceptor having and endless photosensitive surface, it is not necessary that successive images be registered along the length of the surface. Where however, the photosensitive surface is not endless (even though mounted on an endless support, e.g. a drum) the engagement of the drive transmission member with the carriage needs to be synchronized with the position of the photosensitive member. In this case, the pick-up points on the drive transmission member should be so spaced that any image projected by the scanning system is properly placed on the photoreceptor.

The drive transmission member which is preferably endless suitably takes the form of a chain, for example, a cable chain, a cable, a belt (e.g. toothed) or like member.

The invention may be applied to a carriage drive assembly including two carriages which are operatively connected but driven at different speeds.

BRIEF DESCRIPTION OF THE DRAWINGS

In order that the invention may be more readily understood, reference will now be made to the accompanying drawings, in which.

DESCRIPTION OF THE PREFERRED EMBODIMENT

In the practice of xerography, various procedures may be followed. By way of illustration an electrostatographic image may be formed on a surface comprising a layer of photoconductive insulating material affixed to a conductive backing which is electrically charged uniformly to render it photosensitive, is then exposed to light from a given image so that an electrostatic latent image is formed thereon in accordance with the light image cast thereon, and finally is caused to be approached by a developer material, which may be fine colored particles carrying electric charge (referred to as toner), or it may be in liquid form, so that the developer material is attracted selectively to the electrostatic latent image, converting the latent image into a visible image. The powder or liquid may subsequently be transferred to a sheet of paper and suitably affixed to it so as to form a permanent print.

On method of exposing the photoconductive layer to light from a given image comprises scanning a lamp or lamps across a document to be copied, the image being projected onto the photoconductive surface by means of a suitable optical system. One system for achieving this is described in U.S. Pat. No. 3,062,109 where lamps which expose successive portions of a document to the photosensitive surface as they are scanned slowly across the document, are mounted on a carriage. At the end of a scanning stroke, the lamps are quickly returned to their start position.

Figure 1:
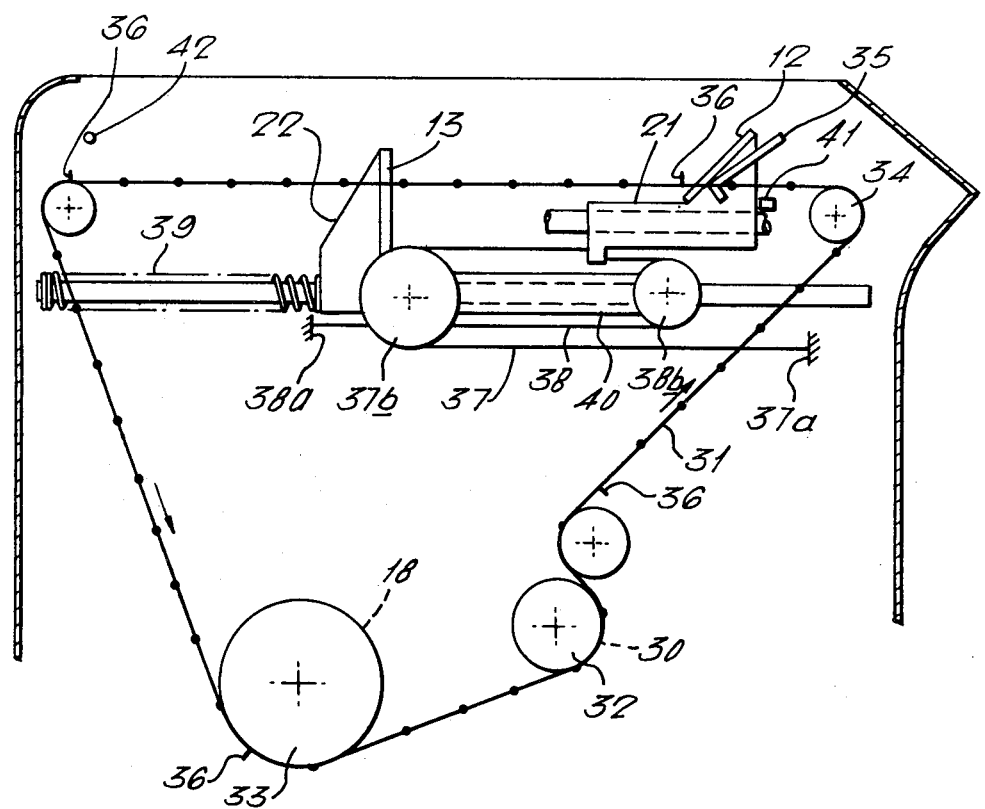
FIG. 1 shows schematically an embodiment of the drive assembly of a photocopying machine in accordance with this invention.
Figure 2:
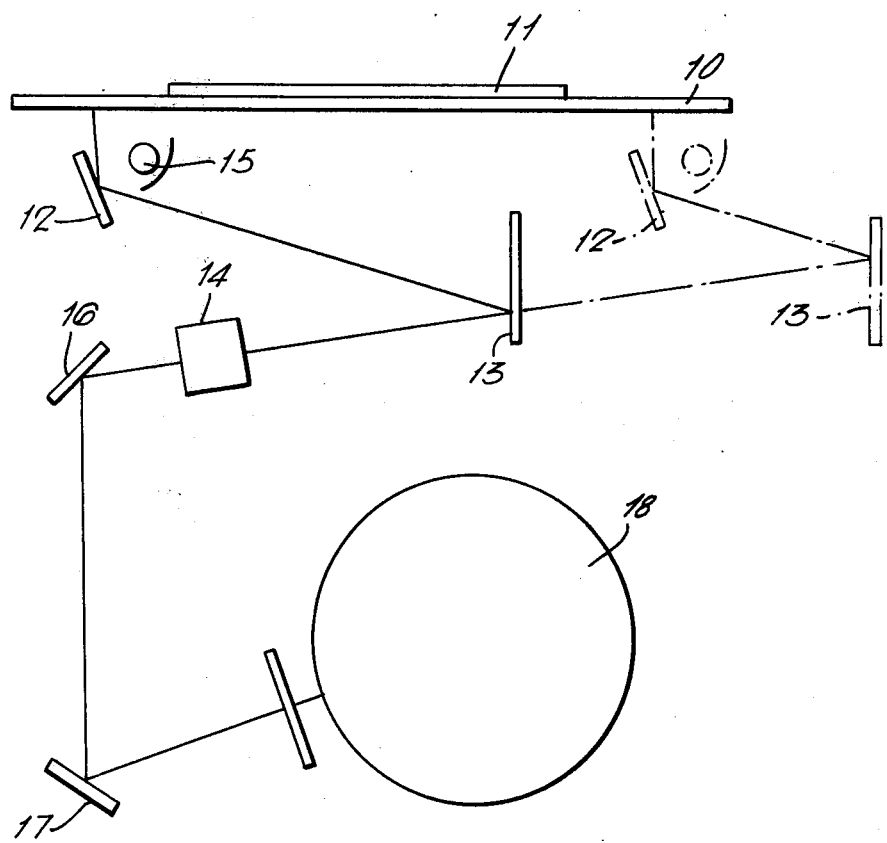
FIG. 2 illustrates the optical arrangement of the scanning system shown in FIG. 1.

The optical arrangement of the system shown in FIG. 1 is illustrated schematically in FIG. 2 and for clarity will be described first, it being noted that the views in FIGS. 1 and 2 are taken from opposite sides of the system. A platen 10 is provided to support a document 11 which is to be copied. A scanning mirror system includes two movable mirrors 12 and 13 shown in their extreme left and right hand positions in FIG. 2 in full and dotted outline respectively. The mirror 13 is arranged to move at half the speed of the mirror 12 during scanning and to maintain the optical distance constant between the document 11 and a lens 14. A tubular lamp 15 extending across the platen 10 parallel to the mirror 12 and in fixed relation to the latter moves with the mirror 12. The lamp 15 serves to illuminate the documents 11 through the platen 10 during scanning. An optical path extending from the platen 10 to the lens 14 continues beyond the lens to be reflected in sequence by mirrors 16 and 17 towards a photoreceptor drum 18. The photoreceptor 18 may take other forms than a drum, e.g. it may be in the form of a belt or a photoconductive copy sheet.

Referring now to FIG. 1, the mirrors 12 and 13 are mounted respectively on carriages 21 and 22 which run on guide rods, tubes or the like 23 and 24 respectively. A common guide bar (not visible) is provided at the opposite side of the carriages to support and stabilize the carriages. The carriage 21 also carries the lamp 15.

In FIG. 1 the carriages 21 and 22 are shown in their start of scan positions and during scanning they move from right to left. The photoreceptor 18 and the carriage assembly 21, 22 are driven from a motor 30 through an endless cable chain 31 which passes over a drive pulley 32 on the output shaft of the motor 30 and a pulley 33 mounted for rotation with the photoreceptor. The photoreceptor is driven through the pulley 33 and the carriage assembly is driven through a pawl mechanism 35. The pawl 35 is pivotally mounted on the full rate carriage 21 and is arranged to be engaged by spaced detents 36 arranged along the cable chain 31. In operation when a detent 36 engages the pawl 35 the carriage assembly moves from its start-of-scan position towards the left in FIG. 1 to effect a scanning movement. The carriage 21 is pulled along directly by the engagement of detent 36 with pawl 35, the movement of the carriage 22 being controlled by connecting cables 37, 38 connected between the full rate carriage 21 and fixed points 37a, 38a via pulleys 37b, 38b on the half rate carriage 22. At the end of the scanning stroke of the carriage assembly the pawl strikes a release or knock-off-member 42 and disengages from the detent 36. Upon the pawl being released the carriage assembly is driven back to its start-of-scan position by a suitable drive such as a compression spring 39. For convenience, the return of the carriages to their start-of-scan positions is termed "re-scan".

In its start-of-scan position the carriage 21 rests against an end stop 40 and at the end of the re-scan stroke the carriage collides with the stop. In order to soften the collision and avoid damage to the system, particularly the lamp 15 which is delicate, especially when hot, the velocity of the carriage assembly as the carriage 21 approaches the stop 40 is controlled by a suitable damping device such as a dashpot 41. In the embodiment illustrated the dashpot acts on the carriage 22 due to space requirements but it could equally act directly on the carriage 21. Suitable dashpots are described in British Pat. No. 1,403,177 and U.S. Pat. No. 3,918,806.

The detents 36 are spaced along the cable chain 31 at intervals sufficient to permit both scan and rescan of the carriage assembly before the next succeeding detent arrives at the pick-up or start-of-scan position of the pawl 35. Where the photosensitive surface of drum 18 is interrupted by a seam, the lead edge of each image projected thereon should be registered for proper positioning on the photoreceptor. For this purpose, in the case of the drum illustrated the detents 36 are spaced by a distance equal to the circumference of the drum 18. Where the photosensitive surface is long enough to receive two or more discrete images at one time (for example where it takes the form of an endless belt) then the detent spacing may be a sub-multiple of the length of the surface. Of course, where the photosensitive surface is endless, the detent spacing may be such that successive images laid down on the photoreceptor are not in register with each other.

In the embodiment illustrated in which the endless transmission member is in the form of a cable chain, the pulleys are toothed and the pulley 33 has a pitch circle diameter identical to the diameter of the photoreceptor so that the cable chain drive travels at a velocity equal to that of the photoreceptor surface. The length of the cable chain is a whole number multiple N, specifically four, of the photoreceptor circumference. In a specific embodiment, the photoreceptor has a circumference of 486 mm and a 9 mm pitch pulley 33 of fifty-four teeth. The pulley 30 has twenty teeth giving a photoreceptor speed of 14.8 r.p.m.

Any suitable form of cable or chain drive may be employed in this invention. However, cable drives as manufactured by Winfred M. Berg Inc. of the United States of America and marketed in the United Kingdom by the Reliance Gear Company under the trade names 'Min-E-Pitch', 'Pow-R-Tow', 'Max-E-Pitch', 'Flex-E-Pitch' and 'Row-L-Er' are particularly suitable.

Various modifications and changes may be made to the specific details referred to hereinabove without departing from the scope of the invention as defined in the appended claims. For example, detents may be provided along the drive transmission member at intervals less than described, for instance ½ N. This enables more flexibility in the choice of length for the member. However, inhibiting means need to be provided to ensure the pawl is picked up only by the correct detents (every other one where the spacing is ½ N). In another form, which is suitable for use where the drive member 31 takes the form of a cable chain or the like, the pawl may engage directly with the elements of the chain. This avoids the need to provide detents on the drive transmission member but necessitates an inhibiting mechanism to ensure that the proper interval is maintained between scanning strokes. In its simplest form such an inhibiting mechanism may take the form of a cam surface which holds the pawl disengaged during rescan.

Although the carriage drive assembly is, in the illustrated embodiment, driven in the re-scan direction by a compression spring various other drive mechanisms may be employed, for example a tension spring or torque spring may be utilized instead.

Although in the embodiment described, a scanning mirror is mounted on the carriage, it will be understood that other components such as scanning lens, may be mounted on the carriage.

What is claimed is:

1. A photocopier including a rotatable drum having a photosensitive surface thereon, an optical system for scanning successive portions of an object plane and directing light reflected from said object plane onto successive portions of said photosensitive surface, said optical system comprising a reciprocable scanning carriage and an endless drive transmission member which continuously, drivingly engages said drum and which discontinuously, drivingly engages the carriage by means of detents spaced along said member by a distance equal to the circumference of said drum.

2. A photocopier as claimed in claim 1 wherein said detents engage the carriage at a start-of-scan position and wherein said optical system further includes means for disengaging the carriage from the detent at the end of scan position and means for returning the carriage to its start-of-scan position.

3. A photocopier as claimed in claim 1 wherein said carriage carries a pawl engagable by said drive transmission member detents.

4. A photocopier including an endless belt having a photosensitive surface thereon, an optical system for scanning successive protions of an object plane and directing light reflected from said object plane onto successive portions of said photosensitive surface, said optical system comprising a reciprocable scanning carriage and an endless drive transmission member which continuously, drivingly engages said endless belt and which discontinuously drivingly engages the carriage by means of detents spaced along said member by a distance equal to a sub-multiple of the length of said belt.

5. A photocopier as claimed in claim 4 wherein said detents engage the carriage at a start-of-scan position and wherein said optical system further includes means for disengaging the carriage from the detent at the end of scan position and means for returning the carriage to its start-of-scan position.

6. A photocopier as claimed in claim 4 wherein said carriage carries a pawl engagable by said drive transmission member detents.

* * * * *